Figure 1:
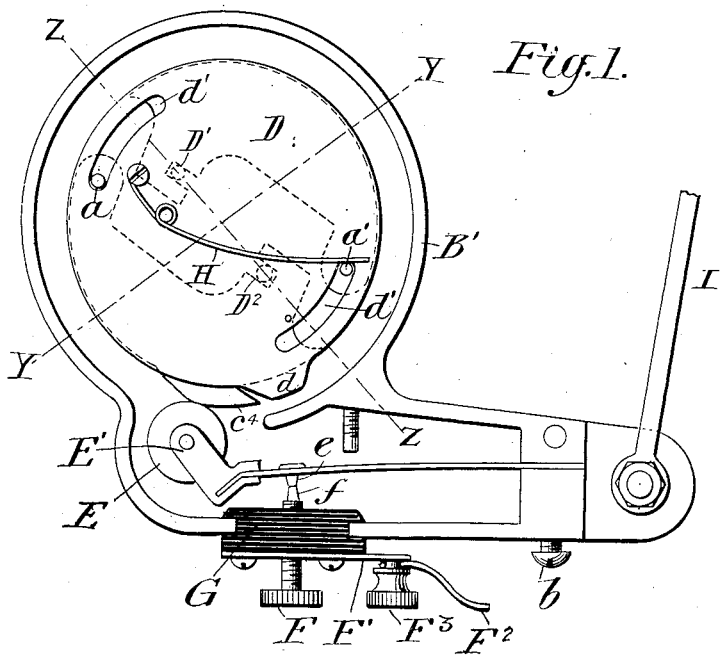

No. 816,083. PATENTED MAR. 27, 1906.
F. O. FARWELL.
CURRENT CONTROLLER FOR IGNITING DEVICES FOR HYDROCARBON ENGINES.
APPLICATION FILED OCT. 21, 1904.

3 SHEETS—SHEET 1.

Witnesses:
O. W. Edelin
Chas. J. O'Neill

Inventor:
Fay O. Farwell,
by Pennie & Goldsborough,
Attys.

No. 816,083. PATENTED MAR. 27, 1906.
F. O. FARWELL.
CURRENT CONTROLLER FOR IGNITING DEVICES FOR HYDROCARBON ENGINES.
APPLICATION FILED OCT. 21, 1904.

3 SHEETS—SHEET 2.

Witnesses:
D. W. Edlin.
Chas. J. O'Neill.

Inventor.
Fay O. Farwell,
by Pennie & Goldsborough
Attys

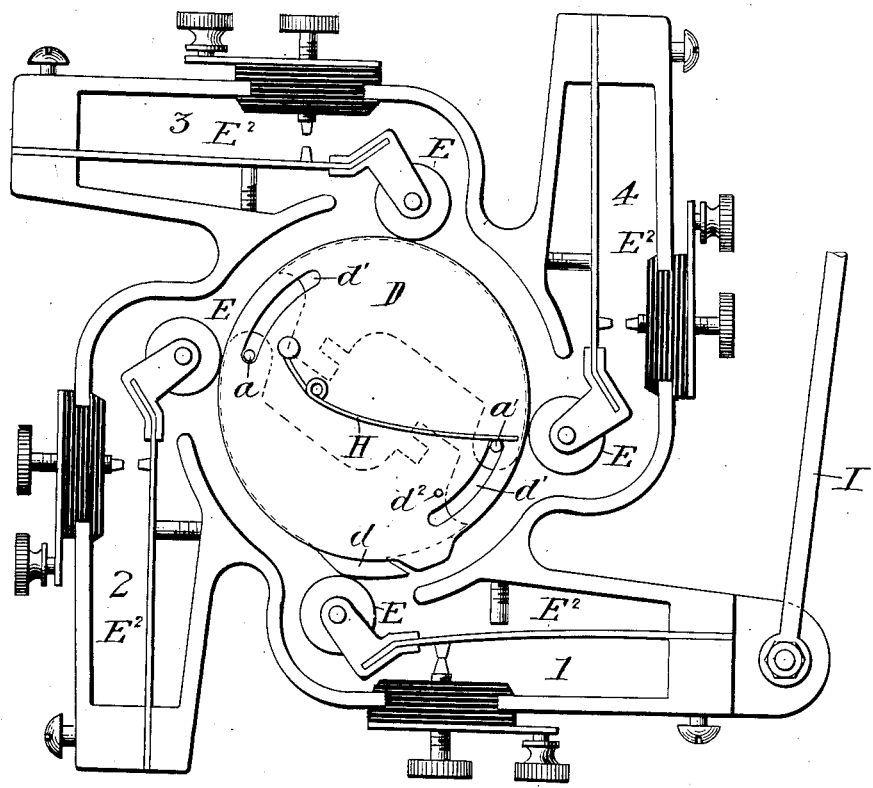

UNITED STATES PATENT OFFICE.

FAY O. FARWELL, OF DUBUQUE, IOWA, ASSIGNOR OF ONE-HALF TO THE ADAMS COMPANY, OF DUBUQUE, IOWA, A CORPORATION OF IOWA.

CURRENT-CONTROLLER FOR IGNITING DEVICES FOR HYDROCARBON-ENGINES.

No. 816,083. Specification of Letters Patent. Patented March 27, 1906.

Application filed October 21, 1904. Serial No. 229,415.

*To all whom it may concern:*

Be it known that I, FAY O. FARWELL, a citizen of the United States, residing at Dubuque, county of Dubuque, State of Iowa, have invented certain new and useful Improvements in Current-Controllers for Igniting Devices for Hydrocarbon-Engines; and I do hereby declare the following to be a full, clear, and exact description of the invention, such as will enable others skilled in the art to which it appertains to make and use the same.

This invention relates to igniting devices for hydrocarbon-engines, and has for its object to provide a simple and efficient apparatus for automatically firing the explosive charge of a hydrocarbon-engine at the proper time when the speed of the engine varies, the device being so constructed and arranged that as the speed of the engine increases the length of time that contact is established will be commensurately increased and, furthermore, the contact will be broken sharply and abruptly irrespective of the speed of the engine, so as to insure sparks of equal intensity for all speeds.

It is well known that a hydrocarbon-engine develops the greatest efficiency when the explosion takes place immediately after the piston commences its upward stroke after having passed the dead-center on the compression-stroke. It is also well known that after the primary circuit of the spark has been closed it takes a certain time before the coil is sufficiently saturated to produce a spark and also that a certain additional time after the spark has passed in the cylinders is required before combustion takes place. These several periods of time, while actually very short, are nevertheless sufficient in the aggregate to allow the engine to turn a part of a revolution, greater or smaller, according to the speed of the engine, before the charge is completely exploded. It has been found, for instance, that when an engine is making a speed of one hundred revolutions per minute it will turn something like one thirty-sixth of a revolution after each contact before the explosion takes place, and if the engine were run at one thousand revolutions per minute it would make as much as one-sixth of a revolution after each contact before the corresponding explosion ensues. Therefore to get the best efficiency from a hydrocarbon-engine that is to be run at varying speeds the time of contact with respect to the revolution of the engine must be varied. In common practice this is done by hand. The present invention is designed to vary the contact of the primary circuit automatically. It is also common practice to make the contact long enough for the highest speed; but under these conditions it will be seen that when the engine is run slowly the contact would be maintained for a period much longer than necessary, and therefore entail a considerable waste of current. By regulating not only the time of contact, but the duration thereof, the present invention also serves to effect the greatest possible economy with respect to the battery-current.

In operating spark-coils without a vibrator effective operation is dependent upon a quick rapid separation of the contact-points to produce a spark. If the separation of the contacts is slow or gradual, a proper tension is not produced, and the spark is of little effect in firing the explosive charge. The present invention, in addition to the features above mentioned, contemplates the provision of means for producing a rapid separation of the contact-points, and consequently a fat or heavy spark even when the engine is turned very slowly, as in starting by hand.

Figure 2:
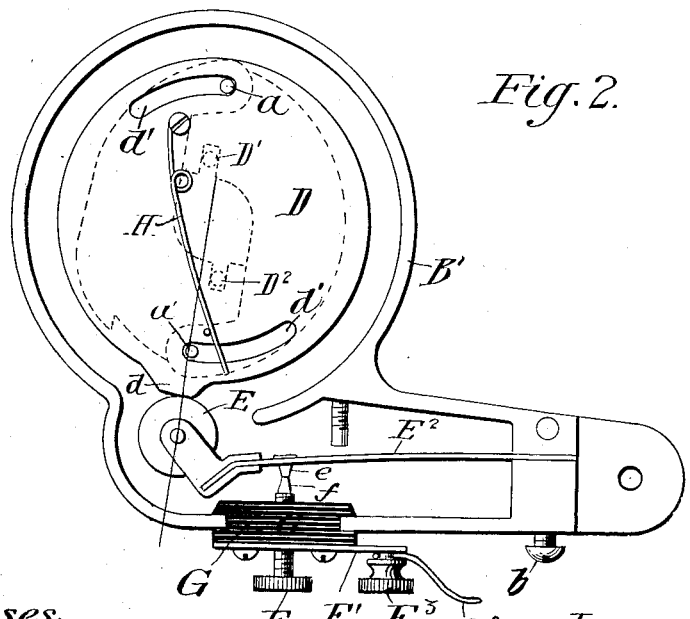
Figure 3:
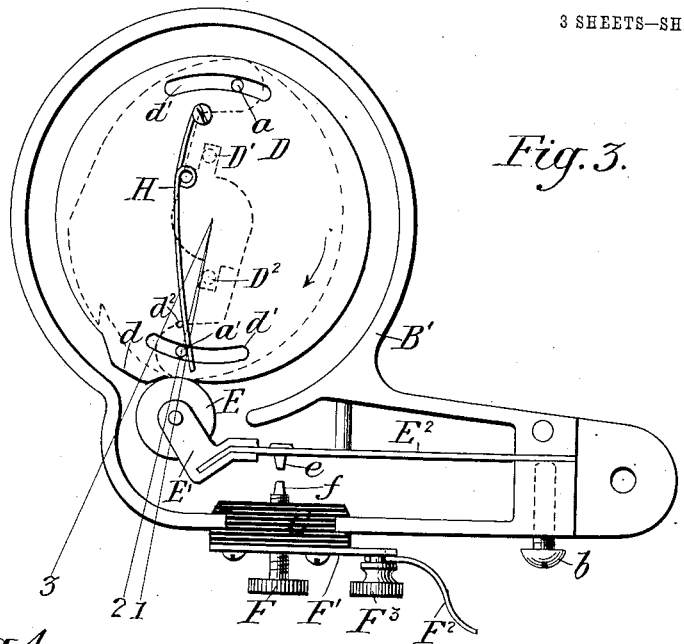
Figures 4, 5:
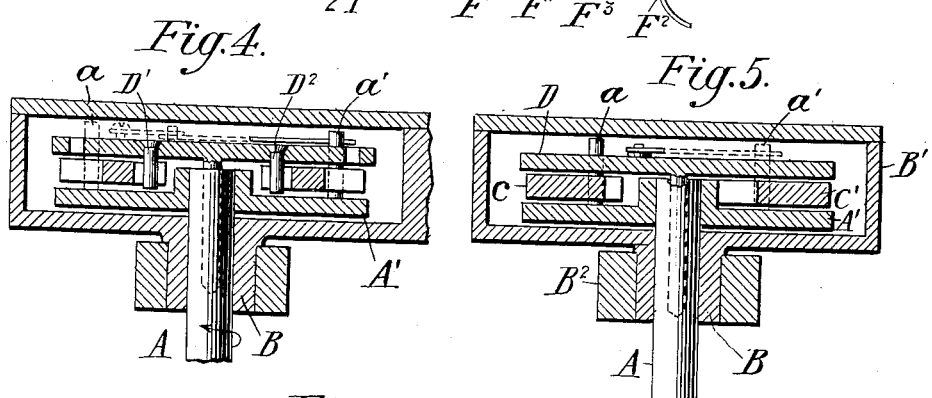
Figures 6, 7:
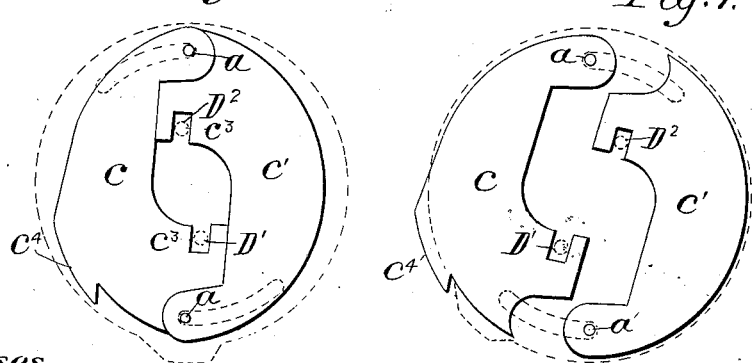

Referring to the accompanying drawings, Figure 1 is a plan view of the device, showing the contact in position for the earliest and longest period. Fig. 2 is a similar view showing the contact in position for the latest and shortest period. Fig. 3 is a corresponding view with the contact broken. Fig. 4 is a section on line Y Y of Fig. 1. Fig. 5 is a section on line Z Z of Fig. 1. Fig. 6 is a plan view of the governor-weights in closed position. Fig. 7 is a corresponding view of the weights in expanded position. Fig. 8 is a plan view of a multiple igniting device of the same general character.

In the drawings, A is a driving-shaft or member which is connected by gearing or otherwise to the engine so that it may be rotated at the proper speed to produce the contact, as frequently desired. Secure on the upper end of the shaft A is a disk A', upon which are mounted two driving-studs *a a'*. Surrounding the upper end of the shaft is the hub B of a casing B', which surrounds and incloses the entire mechanism. The said hub is preferably journaled in a bracket or support B², so that the entire casing may be conveniently revolved to set the apparatus for the proper position or time of spark.

Pivoted to the studs $a\ a'$ are the governor-weights $c\ c'$, which are adapted to swing upon their respective pivots from the position shown in Fig. 6 to that shown in Fig. 7.

Pivoted to the top of the shaft A is a cam-disk D, having two downwardly-projecting studs D' and D² secured therein in such relation as to engage recesses $c^3\ c^3$ in the governor-weights $c\ c'$. Extending from the periphery of the cam D is a short cam projection $d$, which is adapted to engage at one point of its revolution with a roller E, which is supported in a bracket E', which in turn is mounted upon the end of a spring E², the other end of which is secured to the frame or casing B' by means of a set-screw $b$. The tendency of the spring E² is to force the roller E into contact with the periphery of the disk D. Secured to the spring E² is a contact-point $e$, forming one of the terminals of the primary circuit of the spark-coil. The coöperating point $f$ is mounted in an adjusting-screw F, which passes through a brass conducting-strip F', to which the conducting-wire F², forming a branch of the primary circuit, is secured by a thumb-nut F³, the screw F being insulated from the frame B by means of a fiber or rubber block G.

The studs $a\ a'$, upon which the governor-weights $c\ c'$ are pivoted, are passed through segmental slots $d'$ in the cam-disk D, and one of these studs is engaged by a spring H, which is secured to the top of the disk D and is adapted to hold the disk with some resistance from rotating faster than the shaft A. On the outer edge of the governor-weight $c$ is a projection $c^4$, which when the weights are expanded, as shown in Figs. 1 and 7, increases or adds to the length of the cam $d$ by an amount substantially commensurate with the speed of the engine, thereby holding the contact-points $e$ and $f$ together for a longer period than they would be held by the cam $d$ alone. In the top of the cam-disk D is a pin $d^2$, placed in such position that when the spring H is in contact with it the end of said spring will be so held with respect to the slot $d'$ that substantially one-fourth of the length of said slot may be traversed by the pin $a\ a'$ before the latter comes in contact with the spring, the object of which construction will be hereinafter explained.

The operation of the device as above described is substantially as follows: The shaft A, and with it all of the rotatory parts, including the cam-disk D, are rotated in the direction indicated by the arrow. In starting a gas or gasolene engine it is usually turned by hand and the speed is very slow. Consequently disk D has a correspondingly-slow rotatory motion, and the cam $d$ engages roller E and forces the latter, with its spring E², outward until contacts $e$ and $f$ are brought together. This condition is maintained while the short cam $d$ lies under the roller E, and a line drawn through the centers of disk D and roller E would pass through the stud $a'$, as shown in Fig. 2. A slight further movement of the disk D, however, would cause the roller E to begin to descend the side of the cam $d$, and the pressure of the spring E² would cause disk D and cam $d$ to move quickly forward in the direction in which it is rotating—that is to say, the force of spring E² applied to the disk D would accelerate the movement of the latter beyond the normal speed imparted thereto from shaft A. For instance, referring to Fig. 3, if the distance which the shaft A rotates at the time of separation of the contacts be indicated by the angular distance between lines 1 and 2 the movement of the cam $d$ would be represented by the angular distance between lines 1 and 3 for the same period of time. Thus the cam would be forced out from under the roller E by the action of spring E², and the contacts $e\ f$ would be separated by a quick snappy action, which would of course produce a heavy spark. It will be seen, furthermore, that this quick separation of the contacts will take place independently of the speed of the engine, so that a practically uniform spark will be produced whether the engine be turning slowly or rapidly. As the speed of the engine increases centrifugal force will tend to throw the governor-weights $c\ c'$ outward from the position shown in Fig. 6 to that in Fig. 7, thereby causing the cam-disk D and the cam $d$ to be advanced in the direction of rotation and also causing the projection $c^4$ to extend beyond the periphery of the disk D, and thereby add its length to that of the cam $d$, causing the contact-points $e$ and $f$ not only to be brought into engagement at an earlier point in the revolution of the shaft A, but also causing them to remain in contact for a longer part of the revolution. When the speed of the engine decreases, the spring H pressing against the pin $a'$ moves the disk D in the direction opposite to its rotation, and thereby returns the cam $d$ thereon to a position where the charge will be ignited at a later period.

As the entire frame B' is journaled on its hub B in the support B², it may be conveniently swung around for properly locating the spark with reference to the stroke of the engine, for which the frame is secured in position by means of the rod I. This swinging movement of the frame may also be employed with advantage when it is desired to have a late spark while the engine is running fast, by which means the speed of the engine is sometimes governed or controlled.

When it is desired to employ the above-desired igniting device upon a multiple-cylinder engine, the casing B' is made of sufficient size to contain a number of contacts corresponding to the number of engine-cylinders. In Fig. 8, for example, there is illustrated an igniter for a four-cylinder engine, the contacts being equally spaced within the casing B' around the shaft A, so that each of the movable contacts will be operated upon at the proper time by the rotation of cam-disk D and the governor-weights $c\ c'$.

Having thus described my invention, what I claim is—

1. An igniting device for hydrocarbon-engines, comprising normally separated contacts, a rotatory driven member adapted to engage one of said contacts to bring the contacts together, a driving member for said rotatory driven member, the latter being capable of a limited rotatory movement independent of its driver, means connected with the movable contact to accelerate the movement of the rotatory driven member after the latter has brought said contacts together, whereby the contacts will be quickly separated, and means for regulating the period of engagement of the contacts to maintain such period substantially constant for various speeds of the engine.

2. An igniting device for hydrocarbon-engines, comprising normally separated contacts, a rotatory disk having a cam adapted to engage one of said contacts to bring the contacts together, a driving-shaft for said disk, connections between the disk and shaft to permit a limited independent rotatory movement of the disk, a spring connected with the movable contact to accelerate the movement of the disk after the latter has brought said contacts together, whereby the contacts will be quickly separated, and means for regulating the period of engagement of the contacts to maintain such period substantially constant for various speeds of the engine.

3. An igniting device for hydrocarbon-engines, comprising normally separated contacts, a rotatory member adapted to engage one of said contacts to bring the contacts together, a driving member for said rotatory member, connections between the driving and rotatory members to permit a limited independent rotatory movement of said rotatory member, a centrifugal governor operated by the driving member to move the rotatory member in relation to the driving member, whereby the contact will be made at a time earlier or later in the movement of the driving member, means connected with the movable contact to accelerate the movement of the rotatory member after the latter has brought said contacts together, and means for regulating the period of engagement of the contacts to maintain such period substantially constant for various speeds of the engine.

4. An igniting device for hydrocarbon-engines, comprising normally separated contacts, a driving member, a rotatory member having a pin-and-slot connection with the driving member to permit a limited independent motion of the rotatory member, means on the rotatory member to bring said contacts together, means connected with the movable contact to accelerate the movement of the rotatory member after the latter has brought the contacts together, whereby the contacts will be quickly separated, and means for regulating the period of engagement of the contacts to maintain such period substantially constant for various speeds of the engine.

5. An igniting device for hydrocarbon-engines, comprising normally separated contacts, a rotatory disk having a cam adapted to engage one of said contacts to bring the contacts together, a driving member for said disk, pin-and-slot connections between the disk and driving member to permit a limited independent rotatory movement of the disk, a spring connected with the movable contact to accelerate the movement of the disk after the latter has brought said contacts together, whereby the contacts will be quickly separated, and means for regulating the period of engagement of the contacts to maintain such period substantially constant for various speeds of the engine.

6. An igniting device for hydrocarbon-engines, comprising normally separated contacts, a rotatory member adapted to engage one of said contacts to bring the contacts together, a driving member for said rotatory member, pin-and-slot connections between the driving and rotatory members to permit a limited independent rotatory movement of said rotatory member, a centrifugal governor operated by the driving member to move the rotatory member in relation to the driving member, whereby the contact will be made at a time earlier or later in the movement of the driving member, means connected with the movable contact to accelerate the movement of the rotatory member after the latter has brought said contacts together, and means for regulating the period of engagement of the contacts to maintain such period substantially constant for various speeds of the engine.

7. An igniting device for hydrocarbon-engines, comprising a fixed contact and a movable spring-contact, a driving-shaft rotated at a speed having a fixed relation to the speed of the engine, a disk free to rotate to a limited extent faster or slower than said shaft, a cam or projection on said disk adapted to engage the spring-contact to close the contacts, and a weight-arm interposed between the shaft and the disk and operating by centrifugal force to move the disk with respect to the shaft, said weight-arm having a projection coöperating with the cam on the disk all so constructed and arranged that the weight-arm controls the length of time of contact with respect to the rotation of the shaft and the spring-contact accelerates the movement of the disk to secure a quick break at the contacts.

8. An igniting device for gas or gasolene engines, comprising normally separated contacts, a driving-shaft rotated at a speed that has a fixed relation to the speed of the engine, a disk free to rotate to a limited extent faster or slower than said shaft, a short projection or cam on said disk adapted to engage the movable contact and close the contacts for a short period, two weight-arms interposed between the shaft and disk, said weight-arms affected by centrifugal force and adapted to move said disk in relation to said shaft, a projection or cam on one of said weight-arms adapted to move out and add to the length of the cam on said disk, whereby the length of time of the electrical contact will be made longer or shorter.

9. An igniting device for gas or gasolene engines, comprising normally separated contacts, a driving-shaft rotated at a speed that has a fixed relation to the speed of the engine, a disk connected to said driving-shaft, a projection or cam on said disk adapted to engage the movable contact and close the contacts, one or more weighted arms secured to said disk, and a projection or cam on one of said arms adapted to be moved by centrifugal force and add its length to the cam on said disk, whereby an electrical contact for a longer or shorter period will be made.

In testimony whereof I affix my signature in presence of two witnesses.

FAY O. FARWELL.

Witnesses:
GEORGE WEARMOUTH,
FLOYD A. OATEY.